F. YOUNGGREN.
TRACTION WHEEL.
APPLICATION FILED APR. 26, 1915.
1,193,957.
Patented Aug. 8, 1916.
3 SHEETS—SHEET 1.
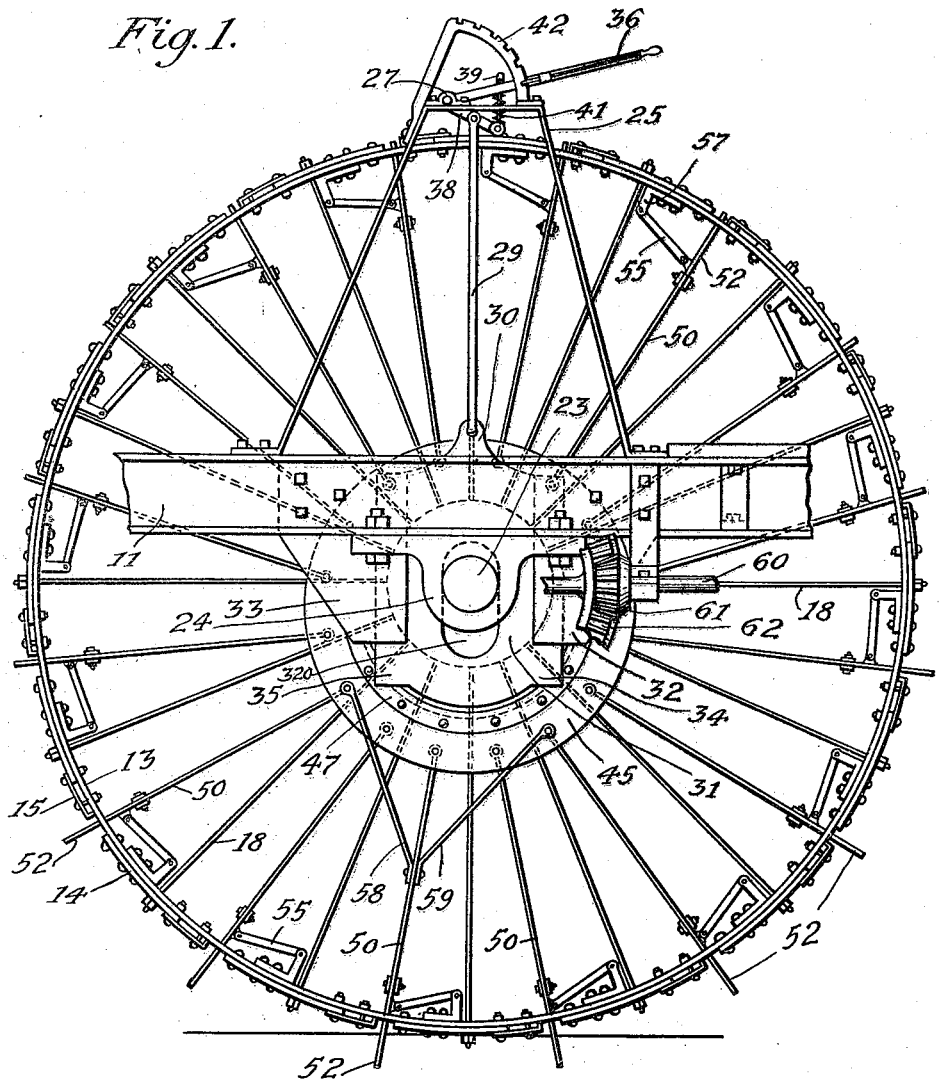

F. YOUNGGREN.
TRACTION WHEEL.
APPLICATION FILED APR. 26, 1915.
1,193,957.
Patented Aug. 8, 1916.
3 SHEETS—SHEET 2.
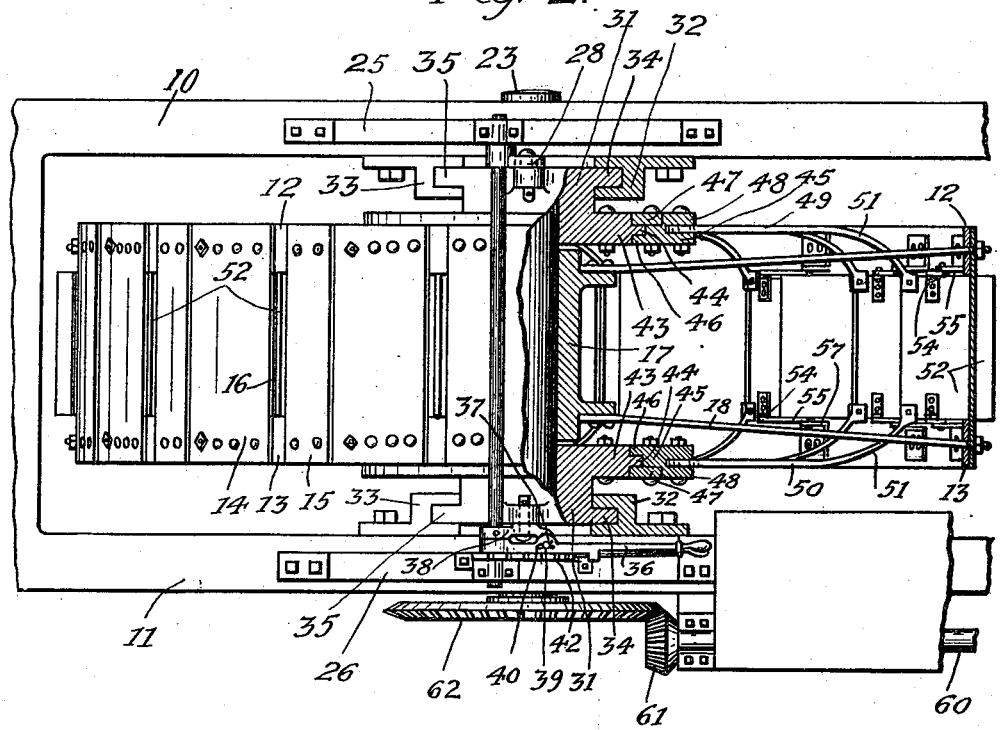
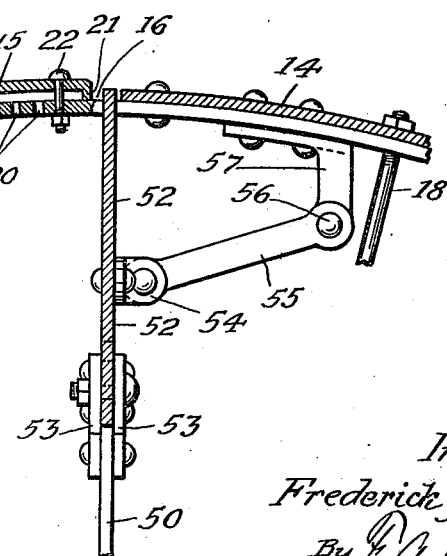
Witnesses:
Theo. Lagaard
H. A. Bowman
Inventor:
Frederick Younggren.
By F. A. Whiteley
his Attorney.

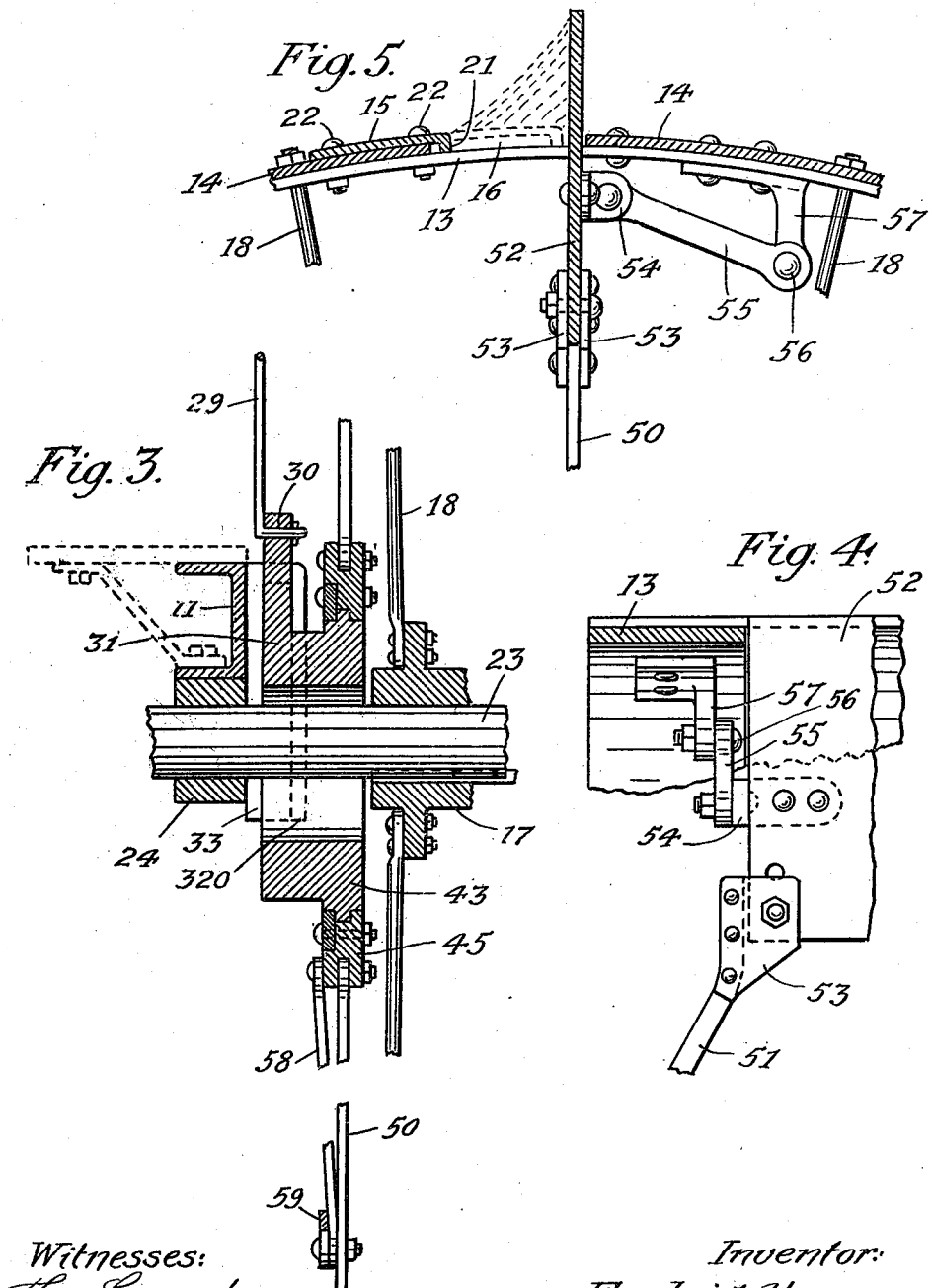

UNITED STATES PATENT OFFICE.

FREDERICK YOUNGGREN, OF RIVER FALLS, WISCONSIN.

TRACTION-WHEEL.

1,193,957.      Specification of Letters Patent.      Patented Aug. 8, 1916.

Application filed April 26, 1915. Serial No. 23,978.

*To all whom it may concern:*

Be it known that I, FREDERICK YOUNGGREN, a citizen of the United States, residing at River Falls, in the county of Pierce and State of Wisconsin, have invented certain new and useful Improvements in Traction-Wheels, of which the following is a specification.

My invention relates to traction wheels, and has for its object to provide a traction wheel particularly adapted to be used as a single traction wheel which shall be fitted with radial movable bars in combination with means for moving said bars to cause the same to be projected and retracted from the bearing surface of the wheels.

My invention also provides novel means for connecting the bars to the wheel and the wheel supporting means, and means for adjusting said connecting means so that the bars may be projected to a greater or less degree and may be projected either entirely to one side of the wheel or entirely to the other side of the wheel, or may not be projected at all but carried about the wheel in a uniform extended condition.

The full objects and advantages of my invention will appear in connection with the detailed description thereof, and are particularly pointed out in the claims.

In the drawings, illustrating my invention in one form, Figure 1 is a side elevation of a portion of a single traction wheel on a traction engine having my traction wheel attached thereto. Fig. 2 is a plan view of the same with some parts broken away. Fig. 3 is a sectional detail view taken along the axle of one side of the wheel. Fig. 4 is a part sectional view taken through a portion of the tire. Figs. 5 and 6 are part sectional fragmentary views showing the manner of mounting the transverse tire plates in relation to the mud-lug plates.

As illustrated in Fig. 2, frame members 10 and 11 of a traction engine provided with a single traction wheel are shown. This traction wheel consists of tire bands 12 and 13 upon which are bolted a plurality of transverse plates 14—15, a space 16 being left between each pair of transverse plates. The tire bands and plates are secured to the wheel hub 17 by means of spoke arms 18 in a well known way. As clearly shown in Figs. 5 and 6, the plates 14 and tire rings 12 and 13 are provided with a plurality of registering holes 19 and the tire rings 12 and 13 with a plurality of holes 20 at the side of the plates 14. The plates 15 have a flange lip 21 which engages the tire rings 12 and 13 and holds the surfaces of said plates parallel with the surfaces of plates 14, while part of the lower surface of plates 15 rests upon plates 14, being secured thereto by bolts 22. It is thus apparent that the plates 15 may be moved or adjusted along the tire rings 12 and 13 so as to make the opening 16 between the same greater or less as may be desired.

The hub 17 is journaled upon an axle 23 which is mounted in boxes 24 carried by the frame members 10 and 11. Upon frame members 10 and 11 are a pair of stands 25 and 26 upon which is journaled a transverse shaft 27 having secured to the ends thereof arms 28 and 38. Pivotally connected to each of the arms 28 and 38 is a link 29 which is attached to an eye 30 of a block 31 formed with an elongated central aperture 32 which straddles the shaft 23. There are thus two of these blocks, one on each side the traction wheel and its hub 17, and the blocks are equally suspended from the frame members through the stands above referred to by the links 29. The block 31 are slidably held in position adjacent the frame members 10 and 11 by means of pairs of clamps 32 and 33 which engage over flanges 34 and 35 formed on the sides of said block. The clamping pieces 32 and 33 are extended downwardly from frame members 10 and 11, as clearly indicated in Fig. 1, and provide elongated guides for the flanges 34 and 35. The arms 28, as before stated, are fast on shaft 27. The shaft 27 has loose thereon a lever 36 formed with an apertured bulge 37 through which extends a pin 39, said pin 39 being pivotally connected at its other end to the arm 38 beyond the point of connection of link 29 with said arm, the pin 39 being restrained from movement through bulge 37 by a key 40. A strong compression spring 41 surrounds pin 39 and the arm 38. In this manner, the lever is connected through arm 38 with shaft 27 and operation of the lever will serve to lift the pieces 31 and parts carried thereby, said pieces being yieldingly restrained from movement in the opposite direction by the spring 41. A ratchet segment 42 with which lever 36 coöperates serves to hold the lever and the pieces 31 in any desired position for adjustment.

The piece 31 carries a circular disk portion 43 having a peripheral flange 44. Upon the disk 43 is journaled a ring 45 having a groove registering over the flange 44 which groove is formed by a flange extension 46 on one side of the ring and a removable ring extension 47 at the other side which permits assembling of the parts. A third ring 48 may also be employed and between rings 45 and 48 are pivotally connected a series of arms 49 and 50 on the respective sides of the hub 17. It will be noted that the disks 46 are brought in close to the ends of hubs 17 and well under the tire rings 12 and 13. The arms 49 and 50 are curved inwardly, as indicated at 51 in Fig. 2, and are rigidly secured at their ends to the inner edges of plates 52 which are adapted to be projected through the spaces 16 between the tire plates 14 and 15. As shown in Figs. 5 and 6, the arms 49 and 50 are secured to plates 52 by means of splicing plates 53 riveted and bolted to both the plates 52 and the arms 49 and 50. The plates 52 are provided at their edges with lug extensions 54 to which are pivotally connected links 55, said links in turn being pivoted at 56 to standards 57 rigidly connected with tire rings 12 and 13. As shown in Figs. 1 and 3 there may be, if desired, brace rods 58 and 59 running from ring 45 to some of the arms 50 and pivotally connected at their ends with the ring 45 and with the rods 50, thus additionally strengthening the action of said rods. The axle 23 is a live axle driven in a well known way from a shaft 60 connected thereto by bevel gearings 61 and 62.

The operation of my device may be readily gathered from the description above given. By means of the lever 36 the pieces 31 may be positioned so that the axial center of the ring 45 carried thereby will be concentric with the axial center of the axle 23, or so that ring 35 will be eccentric to said axis 23 either above or below the same. When the centers of the ring 45 is concentric to axle 43 the arms 49 and 50 will hold the plates 52 so that the same will be projected uniformly through the openings 16 at all portions of the circumference of the wheel, and each projection will be restrained during the rotation of the wheel. When, however, the center of ring 45 is below the center of axis 23, the plate 52 will be unequally projected through the tire face openings 16, the plates being at their maximum projection at the bottom of the wheel where the face thereof engages the earth and at the minimum projection at the top. On the other hand by lifting the pieces 31 so as to bring the center of ring 45 above axle 23, the minimum projection of the plates 52 will be at the bottom. It is obvious that the members 31 may be raised sufficiently to entirely withdraw the plates at the bottom as the wheel rotates so that where the traction engine is being driven over hard roads or pavements, the plates will be taken out of operation. When the ring 45 is eccentric either above or below the axle 23 the plates 52 as they are projected will travel in a gyratory path due to the connection by the links 55 with the tire rings. This movement is particularly effective in cleaning dirt from the plates. In fact, it would be impossible for an accumulation of mud or dirt to take place in this construction. Furthermore, the connection of the plates 52 directly to the tire rings 12 and 13 by means of the pivoted links 55 transmits the tractive power from the wheel to the ground through plates 52 in a highly efficient manner which will not bind or injure the plates, and at the same time produces no friction in oscillating the plates and does not increase materially the power required in driving the wheel by reason of the projection and retraction of the ground engaging plates.

I claim:

1. In combination with a single traction wheel and frame members on each side thereof and the axle of the traction wheel journaled therein, said traction wheel having its face formed with transverse slots, a block mounted to slide vertically on each side of said frame members each of said blocks having a vertical slot through which the axle extends, a rotatable ring journaled on each block, means under the control of the operator for simultaneously sliding said blocks so that the rings may be made concentric to said axle or eccentric to the same either above or below the axle, links pivotally connected with the wheel rim, traction plates extending through said slots pivotally connected with the links, and rods rigidly secured to the traction plates and pivotally connected with said rings.

2. A traction wheel comprising a hub, a pair of tire rings, spokes securing said tire rings to the hub, transverse plates secured to said tire rings and spaced apart at intervals to leave transverse slots between the plates and tire rings, links having a pivotal connection with said tire rings, traction plates extending through said slots having pivotal connection with the links, and means connected with the plates and rotatable with the wheel for projecting and retracting the traction plates.

3. A traction wheel comprising a hub, a pair of tire rings, spokes securing said tire rings to the hub, transverse plates secured to said tire rings and spaced apart at intervals to leave transverse slots between the plates and tire rings, links having a pivotal connection with said tire rings, traction plates extending through said slots having pivotal connection with the links, means connected with the plates and rotatable with the wheel for projecting and retracting the traction plates, and means under the control of the operator for adjusting said projecting means so that the traction plates may be projected a greater or less degree either from the top or the bottom of the wheel or may be projected equally throughout the circumference of the wheel.

In testimony whereof I affix my signature in presence of two witnesses.

FREDERICK YOUNGGREN.

Witnesses:
F. M. WHITE,
PEARL PETERSON.